United States Patent
Hwang

(10) Patent No.: US 12,468,776 B2
(45) Date of Patent: Nov. 11, 2025

(54) METHOD AND SYSTEM FOR PROVIDING CUSTOMIZED CONTENT USING GENERATIVE ARTIFICIAL INTELLIGENCE

(71) Applicant: Piamond Corp., Busan (KR)

(72) Inventor: Doo Geon Hwang, Busan (KR)

(73) Assignee: PIAMOND CORP., Busan (KR)

( * ) Notice: Subject to any disclaimer, the term of this patent is extended or adjusted under 35 U.S.C. 154(b) by 0 days.

(21) Appl. No.: 18/535,434

(22) Filed: Dec. 11, 2023

(65) Prior Publication Data

US 2024/0241920 A1    Jul. 18, 2024

(30) Foreign Application Priority Data

Dec. 12, 2022 (KR) .................. 10-2022-0172872
Dec. 5, 2023 (KR) .................. 10-2023-0174802

(51) Int. Cl.
*G06F 16/958* (2019.01)
*G06N 3/0475* (2023.01)
*G06Q 30/0202* (2023.01)

(52) U.S. Cl.
CPC ......... *G06F 16/958* (2019.01); *G06N 3/0475* (2023.01); *G06Q 30/0202* (2013.01)

(58) Field of Classification Search
CPC ........ G06F 16/958; G06F 21/44; G06F 21/64; G06F 21/10; G06F 3/048; G06N 3/0475; G06N 20/00; G06N 5/04; G06Q 30/0202; G06Q 50/10; H04L 9/32; H04L 67/535; H04L 41/16
See application file for complete search history.

(56) References Cited

U.S. PATENT DOCUMENTS

| | | | | |
|---|---|---|---|---|
| 2020/0034887 A1* | 1/2020 | Hamedi | ............. | G06Q 30/0244 |
| 2021/0173864 A1* | 6/2021 | Aravamudan | ........ | G06F 16/435 |
| 2021/0333957 A1* | 10/2021 | Golan | .................. | G06F 3/0485 |
| 2022/0188698 A1* | 6/2022 | Halecky | ............. | G06Q 30/0613 |
| 2022/0377424 A1* | 11/2022 | Deng | ................. | G06Q 30/0282 |
| 2024/0127510 A1* | 4/2024 | Darabi | .................... | G06T 11/60 |
| 2024/0212243 A1* | 6/2024 | Sadalgi | ............. | G06Q 30/0643 |

FOREIGN PATENT DOCUMENTS

WO    WO-2022232214 A1 * 11/2022 ............. G06N 3/045

* cited by examiner

*Primary Examiner* — Eric J Yoon
(74) *Attorney, Agent, or Firm* — ArentFox Schiff LLP; Joseph M. Maraia; Marlo S. Grolnic

(57) ABSTRACT

A method and system for providing customized content using generative artificial intelligence is disclosed. According to one example embodiment, a method for providing content may include collecting content information of original content and behavior information of a user for the original content, in relation to the original content already provided to the user, inferring preference information of the user based on the content information and the behavior information, generating target content through a generative artificial intelligence model based on the inferred preference information of the user, and providing the generated target content.

8 Claims, 11 Drawing Sheets

METHOD AND SYSTEM FOR PROVIDING CUSTOMIZED CONTENT USING GENERATIVE ARTIFICIAL INTELLIGENCE

CROSS-REFERENCE TO RELATED APPLICATION

This application claims the benefit of priority under 35 U.S.C. § 119 to Korean Patent Application No. 10-2022-0172872 filed on Dec. 12, 2022 and Korean Patent Application No. 10-2023-0174802 filed on Dec. 5, 2023, in the Korean Intellectual Property Office (KIPO), the entire contents of which are incorporated herein by reference.

BACKGROUND

1. Field

The following description relates to a method and system for providing user-customized content using generative artificial intelligence.

2. Description of Related Art

In a web content environment in which a dynamic content generation environment is supported, it is required for provision of real-time customized content that reflects characteristics of a user, such as performing customized campaigns based on tastes of a user and behavior of a user.

SUMMARY

Example embodiments provide a method and system for providing user-customized content using generative artificial intelligence.

According to an example embodiment, there is provided a method for providing content of a computer device including at least one processor, the method for providing content including collecting content information of original content and behavior information of a user for the original content, in relation to the original content already provided to the user, by the at least one processor; inferring preference information of the user based on the content information and the behavior information, by the at least one processor; generating target content through a generative artificial intelligence model based on the inferred preference information of the user, by the at least one processor; and providing the generated target content, by the at least one processor.

According to an aspect, the providing the generated target content may update content located at bottom of a first page in real-time as the target content according to user's scrolling for the first page including the original content, or provide the target content through a second page that the user visits through the first page.

According to another aspect, the generating the target content may generate the target content by using a first preference information of the user previously inferred for a third page which is previous page of the first page including the original content in case that content consumption time of the user inferred based on the behavior information is faster than average, and generate the target content by using a second preference information of the user inferred for the first page in case that the content consumption time is slower than the average.

According to still another aspect, the page including the original content may include a function for collecting behavior information of a user for the page in real-time and asynchronously.

According to still another aspect, the method for providing content may further include storing identification information of the original content, or identification information of page including the original content in association with the target content, by the at least one processor.

According to still another aspect, the storing may further associate and store response information of the user for the target content.

According to still another aspect, the generating the target content may generate the target content by further using weights according to response information of users for target contents previously provided.

According to still another aspect, the generating the target content may include determining whether to provide the target content based on at least one of setting of a provider of the original content related to provision of target content using the generative artificial intelligence model and consent of the user; and generating target content through the generative artificial intelligence model based on the inferred preference information of the user in case that it is determined to provide the target content.

According to still another aspect, the method for providing content may further include generating an effect report by analyzing effects according to provision of the target content, by the at least one processor.

According to still another aspect, the generating the effect report may include sampling data for provision of non-generative content and generative content; calculating at least one information of order conversion rate and revisiting rate for the sampling data by analyzing action information for the sampling data; and calculating expected profit rate of the generative content based on service provider standard cost based on the calculated at least one information.

According to an example embodiment, there is provided a computer program stored in a computer-readable recording medium to execute the method on a computer device in conjunction with the computer device.

According to an example embodiment, there is provided a computer-readable recording medium storing a computer program to execute the method on a computer device.

According to an example embodiment, there is provided a computer device including at least one processor implemented to execute an instruction readable in the computer device, wherein the computer device is configured to collect content information of original content and behavior information of a user for the original content, in relation to the original content already provided to the user, by the at least one processor, infer preference information of the user based on the content information and the behavior information, by the at least one processor, generate target content through a generative artificial intelligence model based on the inferred preference information of the user, by the at least one processor, and provide the generated target content, by the at least one processor.

DETAILED DESCRIPTION

Hereinafter, example embodiments will be described with reference to the accompanying drawings.

A system for providing content according to the example embodiments may be implemented by at least one computer device. Here, a computer program according to an example embodiment may be installed and executed on the computer device that implements the system for providing content, and the computer device may perform a method for providing content according to the example embodiments under control of the executed computer program. The aforementioned computer program may be stored in a computer-readable recording medium to execute the method for providing content in conjunction with the computer device.

Figure 1:
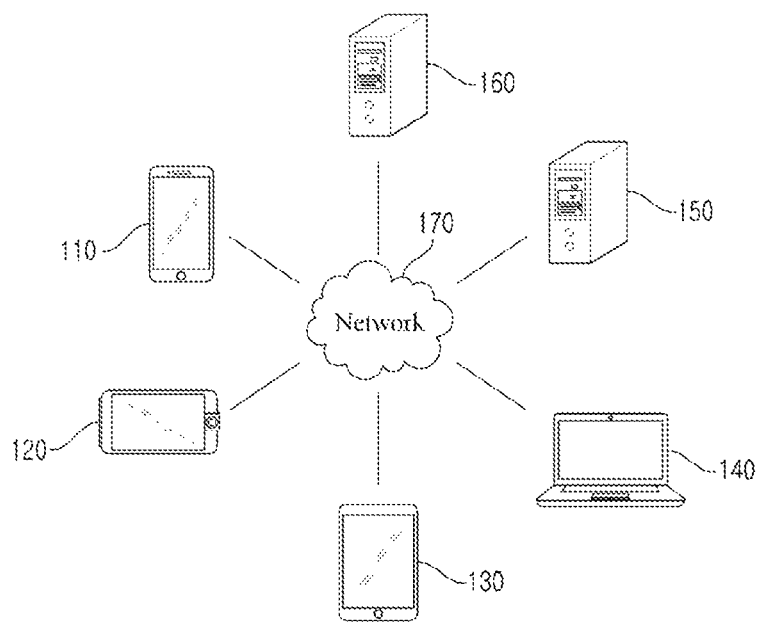
FIG. 1 is a drawing illustrating an example of a network environment according to an example embodiment.

FIG. 1 is a drawing illustrating an example of a network environment according to an example embodiment. The network environment of FIG. 1 indicates an example including a plurality of electronic devices 110, 120, 130, and 140, a plurality of servers 150 and 160, and a network 170. FIG. 1 is provided as an example only and the number of electronic devices or the servers is not limited thereto.

The plurality of electronic devices 110, 120, 130, and 140 may be stationary terminals or mobile terminals implemented with a computer system. As examples of the plurality of electronic devices 110, 120, 130, and 140, there are a smartphone, a mobile phone, a navigation device, a computer, a laptop computer, a terminal for digital broadcasting, personal digital assistants (PDA), a portable multimedia player (PMP), a tablet PC, a game console, a wearable device, an IoT (Internet of Things) device, a VR (virtual reality) device, an AR (Augmented reality) device, etc. As an example, in FIG. 1, a shape of a smartphone is illustrated as an example of the electronic device 110, but in embodiments of the present disclosure, the electronic device 110 may mean one of various physical computer systems capable of communicating with other electronic devices 120, 130, and 140 and/or the servers 150 and 160 through the network 170 by substantially using wireless or wired communication method.

A communication method is not limited, and may include short-distance wireless communication between devices in addition to communication methods using communication networks (e.g., a mobile communication network, wired Internet, wireless Internet, a broadcasting network, a satellite network, and the like) which may be included in the network 170. For example, the network 170 may include one or more any networks of a personal area network (PAN), a local area network (LAN), a campus area network (CAN), a metropolitan area network (MAN), a wide area network (WAN), a broadband network (BBN), and the Internet. Furthermore, the network 170 may include any one or more of network topologies, including a bus network, a star network, a ring network, a mesh network, a star-bus network, and a tree or hierarchical network, but is not limited thereto.

Each of the servers 150 and 160 may be implemented with a computer device or a plurality of computer devices for providing instructions, code, files, contents, or services by communicating with the plurality of electronic devices 110, 120, 130, and 140 through the network 170. For example, the server 150 may be a system that provides a first service to the plurality of electronic devices 110, 120, 130, and 140 connected through the network 170, and the server 160 also may be a system that provides a second service to the plurality of electronic devices 110, 120, 130, and 140 connected through the network 170. As more particular example, through an application as a computer program installed and driven in the plurality of electronic devices 110, 120, 130, and 140, the server 150 may provide a service targeted by the corresponding application (e.g., search service and the like) as the first service to the plurality of electronic devices 110, 120, 130, and 140. As another example, the server 160 may provide a service for distributing a file for installation and drive of above described application to the plurality of electronic devices 110, 120, 130, and 140 as the second service.

Figure 2:
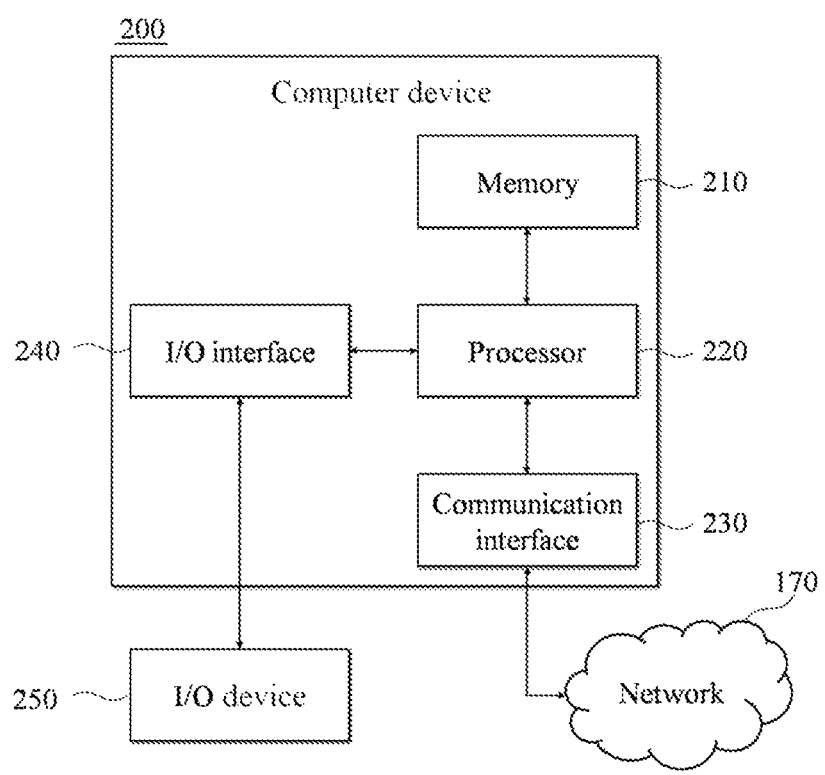
FIG. 2 is a block diagram illustrating an example of a computer device according to an example embodiment.

FIG. 2 is a block diagram illustrating an example of a computer device according to an example embodiment. Each of the plurality of electronic devices 110, 120, 130, and 140 or each of the servers 150 and 160 described above may be implemented by a computer device 200 of FIG. 2.

As illustrated in FIG. 2, such computer device 200 may include a memory 210, a processor 220, a communication interface 230, and an input/output (I/O) interface 240. The memory 210 is a computer-readable recording medium, and may include permanent mass storage devices, such as a random access memory (RAM), a read only memory (ROM) and a disk drive. Here, the permanent mass storage device, such as a ROM and a disk drive, may be included in the computer device 200 as a permanent storage device separated from the memory 210. Furthermore, an operating system and at least one program code may be stored in the memory 210. Such software components may be loaded from a computer-readable recording medium separated from the memory 210 to the memory 210. Such a separate computer-readable recording medium may include computer-readable recording media, such as a floppy drive, a disk, a tape, a DVD/CD-ROM drive, a memory card, and the like. In another embodiment, software components may be loaded onto the memory 210 through the communication interface 230, not a computer-readable recording medium. For example, the software components may be loaded onto the memory 210 of the computer device 200 based on a computer program installed by files received through the network 170.

The processor 220 may be configured to process instructions of a computer program by performing basic arithmetic, logic and I/O operations. The instructions may be provided to the processor 220 by the memory 210 or the communication interface 230. For example, the processor 220 may be configured to execute instructions received according to program code stored in a recording device, such as the memory 210.

The communication interface 230 may provide a function for enabling the computer device 200 to communicate with other devices (e.g. above described storing devices) through the network 170. For example, a request, an instruction, data or a file generated by the processor 220 of the computer device 200 according to program code stored in a recording device such as the memory 210 may be transmitted to other devices through the network 170 according to control of the communication interface 230. Inversely, a signal, an instruction, data or a file from another device may be received to the computer device 200 through the communication interface 230 of the computer device 200 passing through the network 170. A signal, an instruction or data and the like received through the communication interface 230 may be transmitted to the processor 220 or the memory 210, and a file may be stored in a storage medium (above described permanent storage device) which may be further included in the computer device 200.

The I/O interface 240 may be means for interface with an input/output (I/O) device 250. For example, the input device may include a device such as a microphone, a keyboard or a mouse and the like, and the output device may include a device such as a display or a speaker. For another example, the I/O interface 240 may be means for interface with a device in which functions for input and output have been integrated into one, such as a touch screen. The I/O devices 250, together with the computer device 200, may be configured as a single device.

Furthermore, in other embodiments, the computer device 200 may include components less or more than the components of FIG. 2. However, it is not necessary to clearly illustrate most of conventional components. For example, the computer device 200 may be implemented to include at least some of the I/O device 250 above described or may further include other components such as a transceiver, a database, etc.

In a web content environment in which a dynamic content generation environment is supported, it is required for provision of real-time customized content that reflects characteristics of a user, such as performing customized campaigns based on tastes of a user and behavior of a user. A channel in which such content is provided may include a channel for web content publishing, a channel for advertisement network or advertisement publisher, a channel for E-commerce advertisement, and the like. The channel for web content publishing may include, for example, blogs, social networks, news pages, social advertisements, and the like. Also, the channel for E-commerce advertisement may include product detail pages and the like.

A system for providing content according to the example embodiments may select or present appropriate words or phrases that match user's taste or preference or inquiry of a user, and generate and provide content for user's characteristics. For example, the system for providing content may generate and provide a product information page that prioritizes specific <function> based on a corresponding inquiry based on Generative AI (Artificial Intelligence) in case that a user inquiries focusing on <function> for a specific product.

Figure 3:
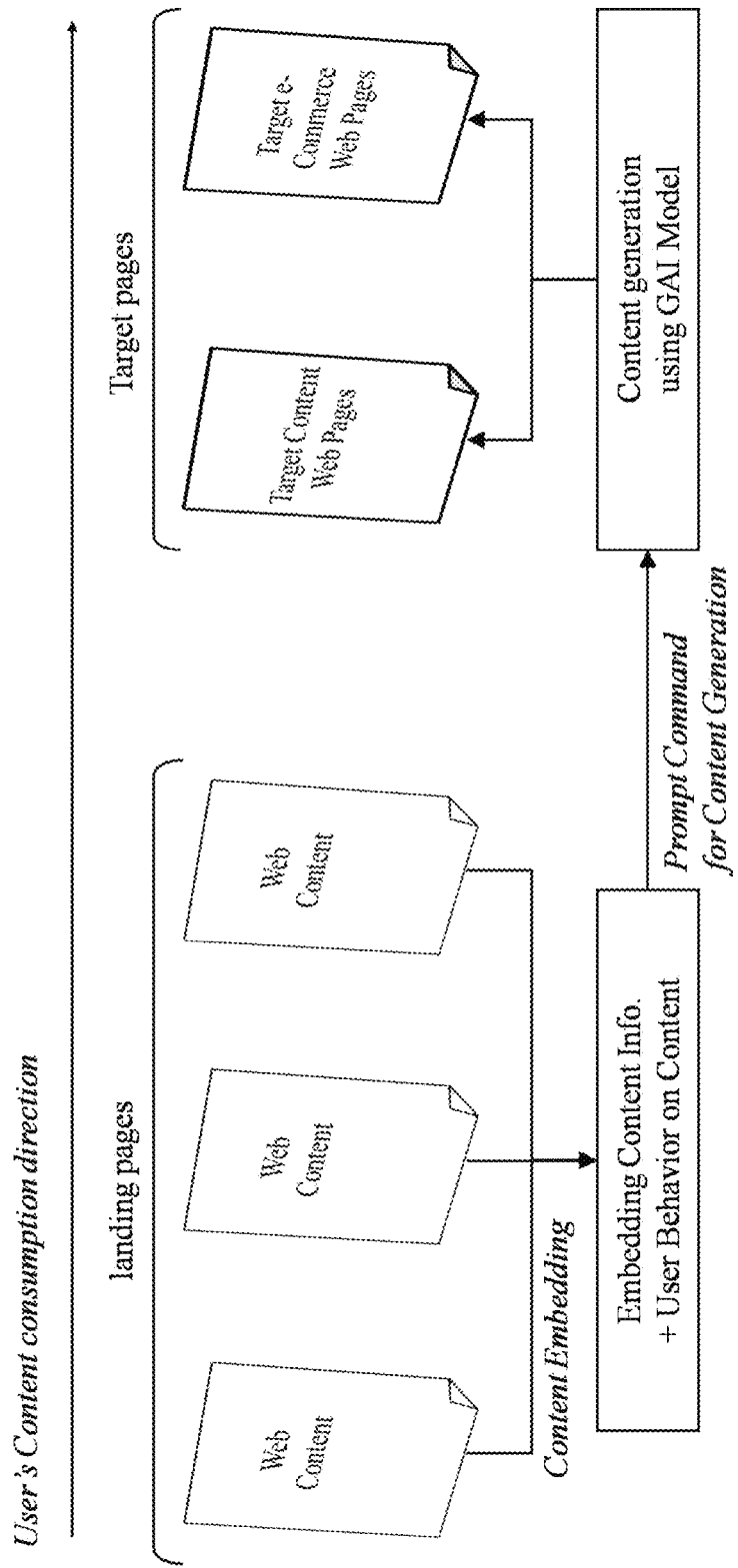
FIG. 3 is a drawing illustrating an example of a process for providing content of a system for providing content according to an example embodiment.

FIG. 3 is a drawing illustrating an example of a process for providing content of a system for providing content according to an example embodiment. The system for providing content may infer user's content interest information based on landing page provided to a user and user behavior information in landing page. The system for providing content may construct and store separate metadata by extracting characteristic information of content for landing page in advance. Such extraction of characteristic information may be performed based on an artificial intelligence model. For example, the system for providing content chunks characteristic information such as text, metadata, and the like included on the content according to provider's intention, and then store it in a separate vector store and the like through embedding process. In this case, when providing target content that a user will be interested in, the system for providing content may generate and provide user-customized content by generating prompt for generative AI through behavior information and characteristic information of content and inputting it to the generative AI. Through this, the system for providing content may maximize user's content consumption satisfaction and staying time.

Figure 4:
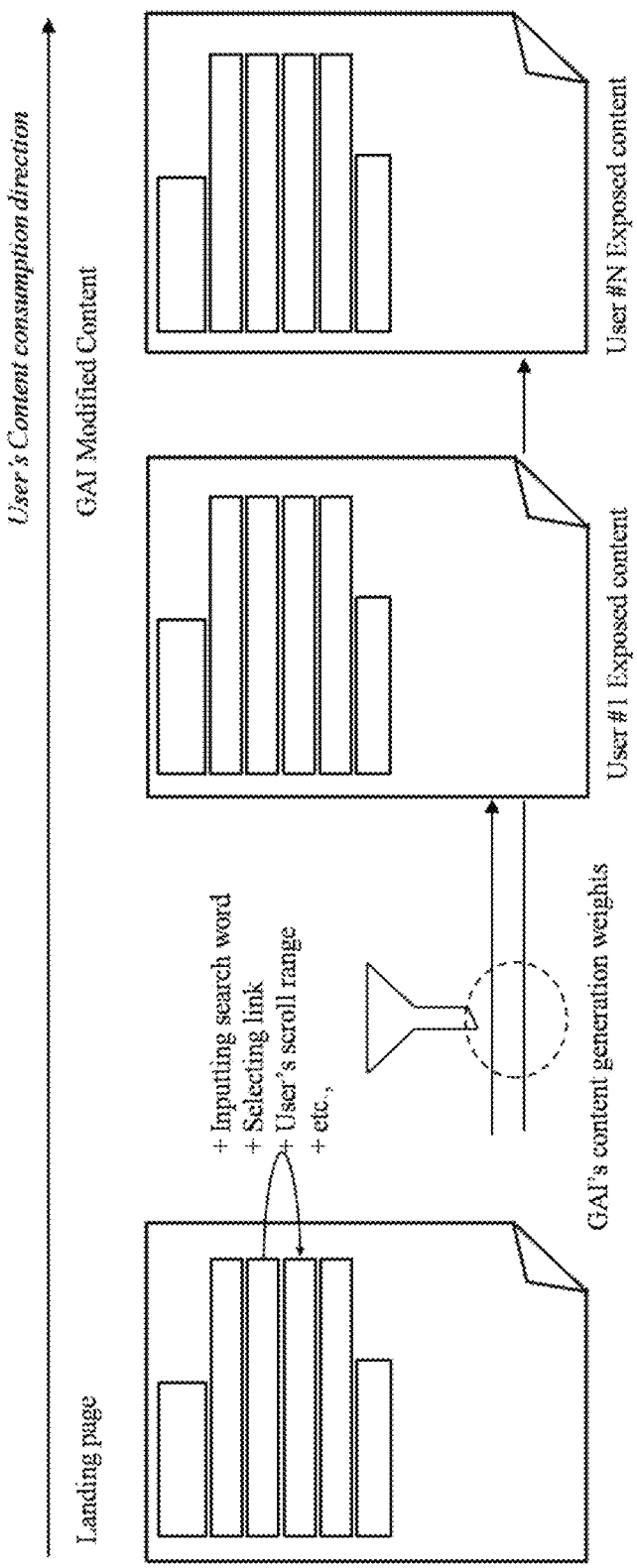
FIG. 4 is a drawing illustrating an example of landing page and customized content according to an example embodiment.

FIG. 4 is a drawing illustrating an example of landing page and customized content according to an example embodiment. The system for providing content may track user behavior based on content of the content previously provided through landing page for introduced user, and collect and analyze preference. In addition, the system for providing content may reflect the collected information in the form of correcting or generating content through generative AI when using user's next content. At this time, user's action information in the page may be utilized as content generating weights of generative AI. Here, the user's action information may be obtained through entering a search word, selecting a link, user's scroll range, and the like.

The system for providing content may increase user access and staying time through providing user-customized content by continuously accumulating user taste information through continuous analysis for user response and dynamically generating content customized for user taste information collected up to a corresponding time when loading to new page. In other words, the system for providing content may utilize generative AI through connecting with CMS (Content Management System) and the like of a content provider for constructing words and sentences, etc. that are highly preferred by user. Also, the system for providing content may generate an image, BGM (Back Ground Music), and the like by using generative AI, or generate related advertisement (e.g. banner advertisement) by combining the corresponding page information with user taste information. Link information related with other contents provided on the corresponding page may be also newly constructed by changing weights based on such generative AI.

The system for providing content may control various contents to be provided to a user by using the generative AI on web content. For example, to control a functional aspect for web page construction, HTML (Hyper Text Markup Language), CSS (Cascading Style Sheet), JavaScript, and the like may be utilized. HTML may be used for controlling content such as content of the content and hypertext, CSS may be used for controlling style of webpage, and JavaScript may be used for controlling event of webpage. In addition, for controlling content characteristics, the system for providing content may list content based on user preference, and provide content by applying a filter function based on the previously identified user information when exposing content. Also, the system for providing content may utilize an interaction structure such as paging, timeline, and the like. In addition, the system for providing content may utilize user behavior (action) information. For example, the system for providing content may control content through user's search behavior for landing page, referral link, and the like. Furthermore, the system for providing content may control content by utilizing user authentication information such as cookies, user's authentication information, user's wallet, and the like. Also, after receiving user's consent in a form of Cookies Consent, the system for providing content may provide a prompt control function to a user so that the user may directly control content by utilizing generative AI.

Figure 5:
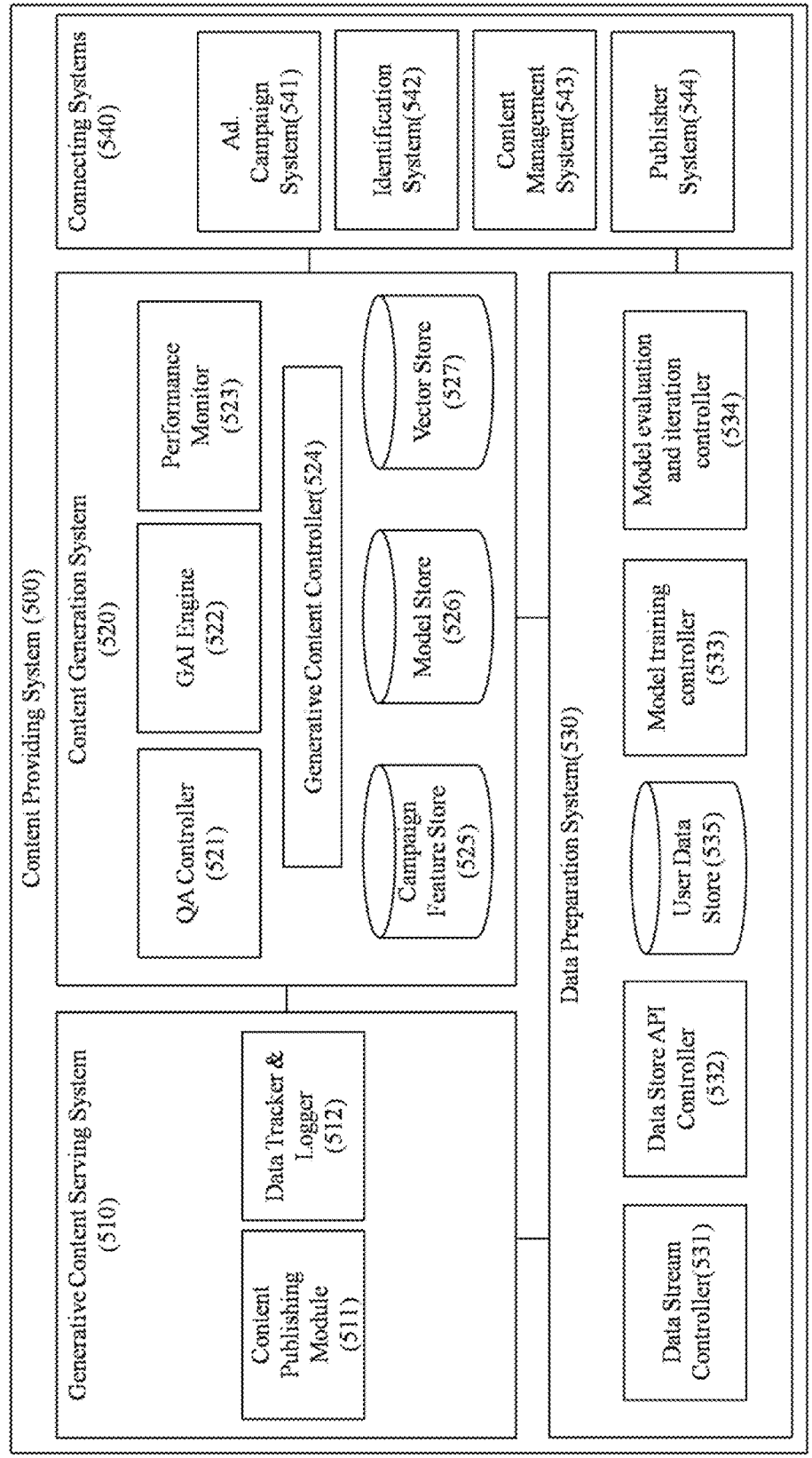
FIG. 5 is a block diagram illustrating an example of internal configuration of a system for providing content according to an example embodiment.

FIG. 5 is a block diagram illustrating an example of internal configuration of a system for providing content according to an example embodiment. A system for providing content 500 may include a generative content serving system 510, a content generating system 520, a data preparation system 530, and a connecting system 540.

The generative content serving system 510 is a system for providing generative content to a user terminal or service, and it may be connected with existing web or mobile, or services in environments such as AR (Augmented Reality), VR (Virtual Reality), MR (mixed Reality), and the like. The generative content serving system 510 may include a content publishing module 511 and a data tracker & logger 512. The content publishing module 511 is a module for ultimately providing content to a user, and it may provide a tracking function according to content consumption characteristics of a user and provide functions for understanding tastes of a user. In addition, the data tracker & logger 512 may track and record user's content consumption characteristics.

The content generating system 520 may be a system for providing generative content by using generative AI (Artificial Intelligence). Such content generating system 520 may include a QA controller 521 for monitoring and evaluating user's response to the generative content, a GAI engine 522 for generating generative content according to service requests, a performance monitor 523 for monitoring performance for generative content, a generative content controller 524 for controlling generative content, a campaign feature store 525 for storing features for campaign, a model store 526 for storing various generative AI models, and a vector store 527 for storing vector of data related to generative AI.

The data preparation system 530 may collect and store data through the generative content serving system 510, and provide the stored data to the content generating system 520. Such data preparation system 530 may include a data stream controller 531 for controlling data stream, a data store API controller 532 for collecting data from data store through API call, a model training controller 533 for training various generative AI models, a model evaluation and iteration controller 534 for evaluating and retraining performance of model, and a user data store 535 for storing information for a user.

The connecting system 540 may provide connection between the system for providing content 500 and various external services. An Ad. campaign system 541, an identification system 542, a content management system 543, and a publisher system 544 which are included by the connecting system 540 may be systems that provide external services to which the system for providing content 500 is connected through the connecting system 540. According to an example embodiment, the system for providing content 500 may directly include at least one of the Ad. campaign system 541, the identification system 542, the content management system 543, and the publisher system 544.

Figure 6:
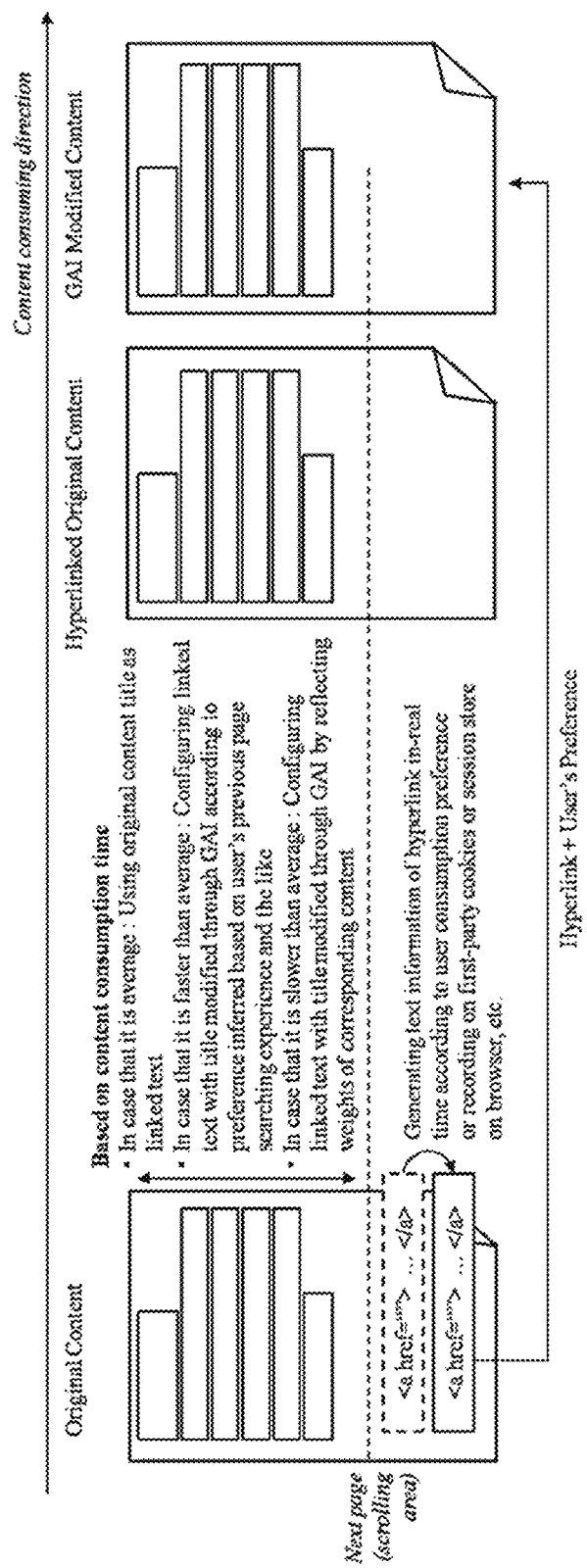
FIG. 6 is a drawing illustrating an example of information collection and delivery process based on user's page search behavior according to an example embodiment.

FIG. 6 is a drawing illustrating an example of information collection and delivery process based on user's page search behavior according to an example embodiment. The system for providing content 500 may modify title of existing linked content based on user preference for original content, and induce clicks on the linked content. In case of mobile page, page search may occur through continuous scrolling. The system for providing content 500 may update content located on the exposed next page or at the bottom of the content timeline in real-time with content customized for user interests by utilizing user's staying time for search.

For this, the system for providing content 500 may transmit the taste information collected for the user (e.g. page staying time, scroll time per content paragraph, exposure range of images, and the like) on the previous page to a target page as a factor in the form of JSON (JavaScript Object Notation) when clinking a hyperlink, and based on this, when configuring content of the loaded page, user preference information may be transmitted as a generative AI model. In this case, when searching for similar content related to user's specific access point in the form of A/B test, the system for providing content 500 may access to find optimal user taste by changing user input preference information of the generative AI model.

Figure 7:
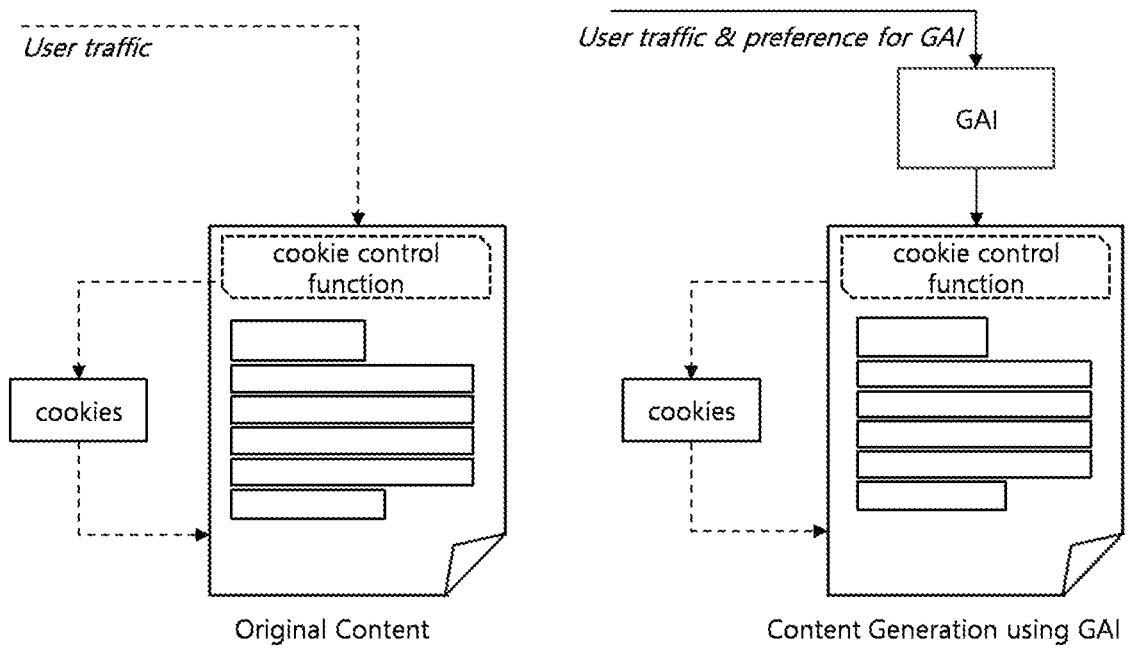
FIG. 7 is a drawing illustrating an example of using generative artificial intelligence for web content according to an example embodiment.

FIG. 7 is a drawing illustrating an example of using generative artificial intelligence for web content according to an example embodiment. When a user enters traffic, for general web content, user's preference information may be estimated based on cookies or landing page request URL information. On the other hand, when utilizing generative AI (Artificial Intelligence), the system for providing content 500 may provide a notification to a user for providing generative AI based content by connecting a generative AI model when a user enters traffic, and may provide a selection function for application range and taste preference strength of generative AI according to user's choice to the user. In addition, when utilizing such generative AI, when using GAI, the system for providing content 500 may store in cookies and utilize identification information (e.g., hash value) for content generated with generative AI, parameter information used when calling generative AI and/or information for providing preference information used in generative AI to external services.

Figure 8:
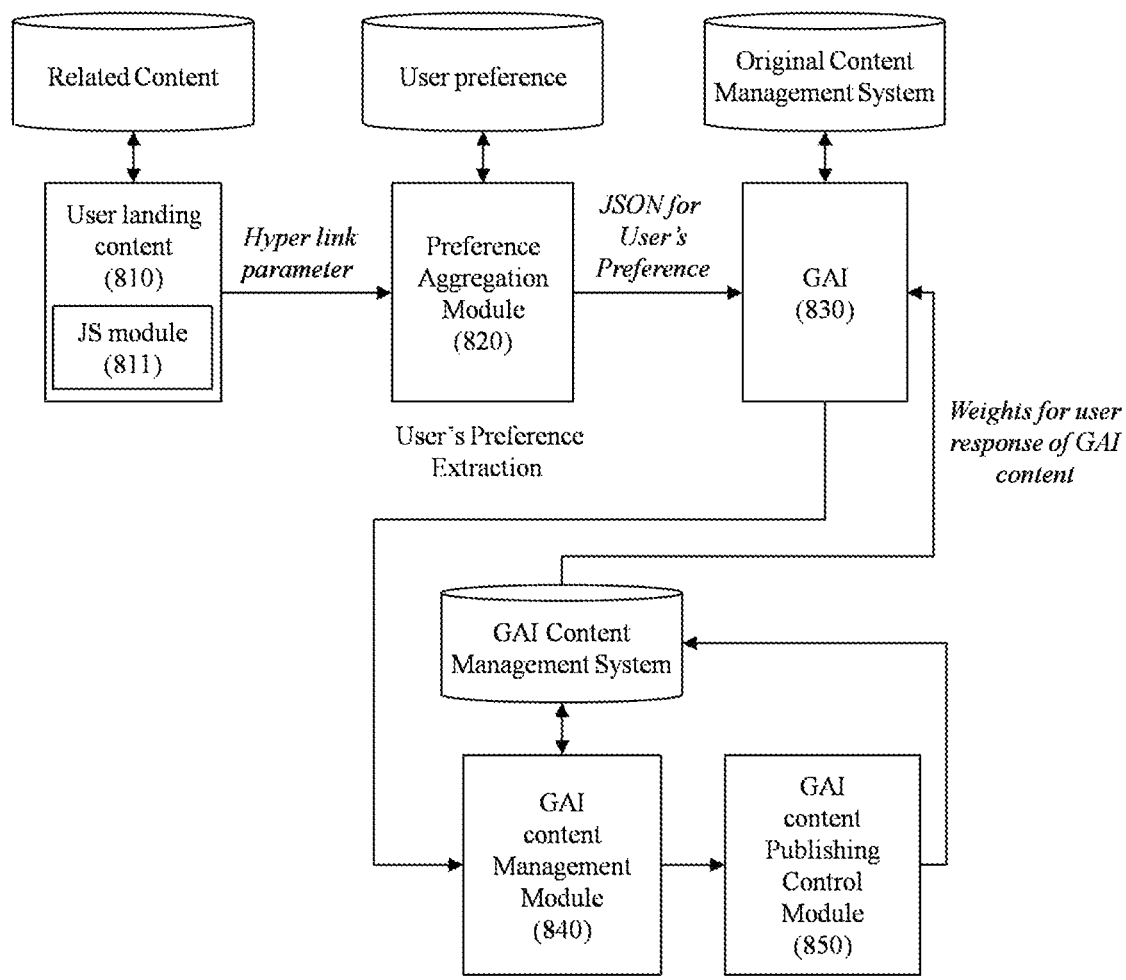
FIG. 8 is a drawing illustrating an example of a process for generating content by using generative artificial intelligence according to an example embodiment.

FIG. 8 is a drawing illustrating an example of a process for generating content by using generative artificial intelligence according to an example embodiment.

When a user enters user landing content 810, the system for providing content 500 may collect user characteristics and interest information on a page for the user landing content 810. At this time, a JS module 811 inserted to the user landing content 810 may track and collect user's preference information in real-time and asynchronously, and may record the collected information in cookies or transmit it as parameter information on hyperlink through HTTP request of a target page that the user requests. When a user moves within the same business operator, reference information for information related to the user landing content 810 may be utilized together with the preference information.

The user's information transmitted through the user landing content 810 may be collected through a preference aggregation module 820 within a service before real target content connection. At this time, data may use first party data or purchase and use third party data. User's taste and interest information may be temporarily collected through the preference aggregation module 820, and it may be used when utilizing content within the page in the future. Also, at this time, whether or not generative AI will intervene may be determined based on content provider's setting (for example, an advertiser's request may be included), user's consent, etc.

GAI (Generative AI (Artificial Intelligence)) 830 may utilize the user characteristic information provided when calling, and modify content by reflecting the user characteristic information to original content to be provided. At this time, when there is no original content, the GAI 830 may directly generate new content.

In case of content modified or generated through the GAI 830, it may be managed through a separate GAI content management module 840. The GAI content management module 840 may generate and manage connection information for connecting the modified and/or generated content with sharing identification information of original content. Such connection information may be used in copyright issues, cost settlement, and the like for original content. In addition, the GAI content management module 840 may store and manage user response information of the modified and/or generated content based on the GAI 830. Also, when generating weights based on user preference and the like of the modified and/or generated content, the GAI content management module 840 may provide the corresponding weights in a form of seed of GAI 830 or incorporate it in a form of a filter.

A GAI content publishing module 850 may publish the modified and/or generated content through the GAI 830. At this time, the GAI content publishing module 850 may control whether to provide generative content according to user preference or taste. In addition, the GAI content publishing module 850 may monitor user response information of the provided generative content and record it separately, thereby collecting information for analyzing effects and the like on user reach rate, response rate, purchase rate, etc. of the generative content in the future.

Figure 9:
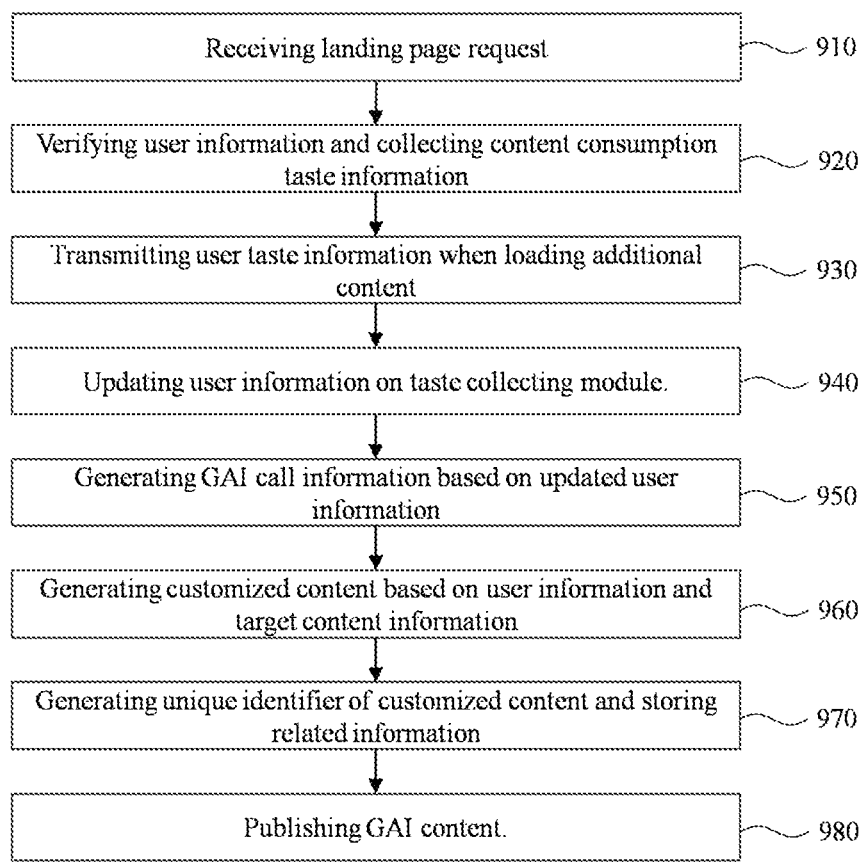
FIG. 9 is a flowchart illustrating an example of a process for generating generative artificial intelligence content according to an example embodiment.

FIG. 9 is a flowchart illustrating an example of a process for generating generative artificial intelligence content according to an example embodiment.

In Step 910, the system for providing content 500 may receive a landing page request. When requesting a landing page from a user, a browser agent for collecting user information required for GAI may be operated. The browser agent may be provided in a separated application form or may utilize information such as user event and web content based on JavaScript, and if necessary, it may be connected with a server side information collecting module. The system for providing content 500 may receive the landing page request through such browser agent.

In Step 920, the system for providing content 500 may verify user information and collect content consumption taste information of a user. For example, the system for providing content 500 may collect content consumption taste information of a user based on collectible user information (e.g., session, URL, cookies, browser agent information, etc.). If necessary, the system for providing content 500 may utilize information of the previous page in user preference measurement of GAI. The system for providing content 500 may manage information collected through a separate client session, and the collected information may be transmitted when loading additional content within the corresponding domain.

In Step 930, the system for providing content 500 may transmit user taste information when loading additional content. When loading of additional content is requested from a user, the system for providing content 500 may transmit the user taste information to a user preference module for GAI. If the related function is configured in a form of federated learning or needs to be performed on a terminal, the corresponding information may exist on a user terminal, and at this time, the corresponding information may be stored and managed in sandbox or secure storage space of the user terminal. In this case, only minimum information for federated leaning may be transmitted to GAI of the system for providing content 500 in the user terminal. As a function similar to this, there is Federated Learning of Cohorts.

In Step 940, the system for providing content 500 may update user information on a taste collecting module. In user's taste collecting module for generating GAI content, user information may be updated, and temporarily or permanently managed as needed. Such information may be managed based on MyData or data sovereignty policy. At this time, based on user's privacy policy and presetting, storage period and management method of user information may be determined.

In Step 950, the system for providing content 500 may generate GAI call information based on the updated user information. For example, the system for providing content 500 may configure the user's taste information to be transmitted as an input value to the GAI, and based on this, by calling the GAI, user taste reflection for original content may be reflected.

In Step 960, the system for providing content 500 may generate customized content based on the user information and target content information. The GAI may process information of the original content based on the user taste information. At this time, the system for providing content 500 may separately record and manage weighs information according to taste for each user.

In Step 970, the system for providing content 500 may generate a unique identifier of the customized content, and store related information. The system for providing content 500 may generate a unique identifier for newly processed customized content based on user input, and store and manage related information. Because there is a difficulty in reconstruction due to the nature of artificial intelligence, the generated customized content may be managed through the unique identifier, and then the corresponding customized content according user's subsequent response or response result for taste may be reused or the corresponding content may be utilized as training data of the GAI.

In Step 980, the system for providing content 500 may publish GAI content. The system for providing content 500 may publish GAI content which is the generated customized content to a user. In this process, advertisements suitable for the generated GAI content may be connected.

Figure 10:
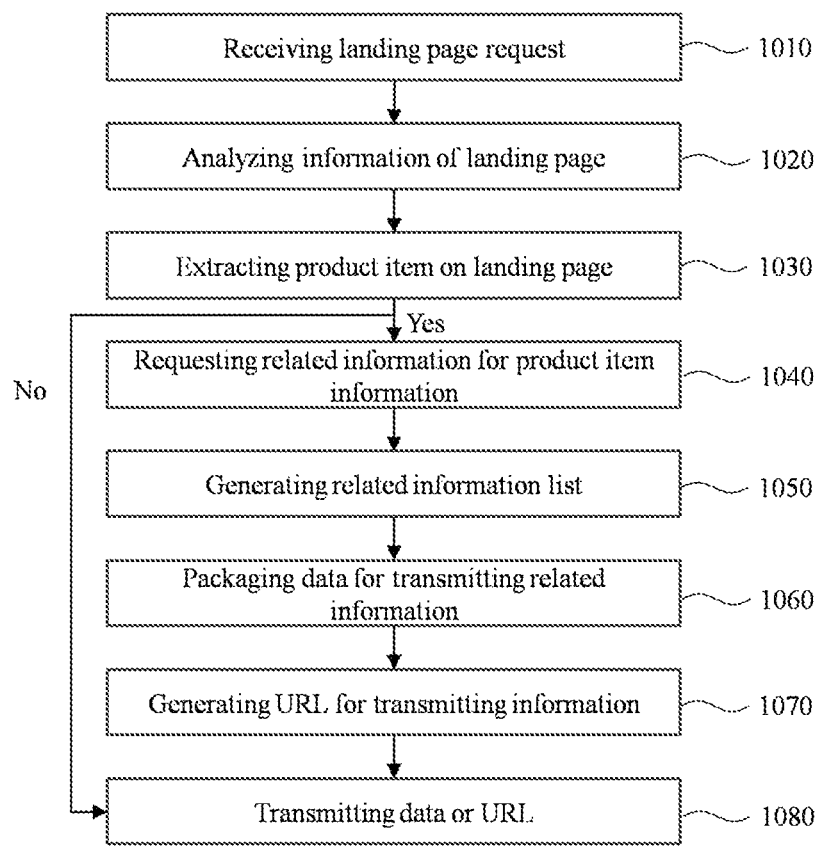
FIG. 10 is a flowchart illustrating another example of a process for generating generative artificial intelligence content according to an example embodiment.

FIG. 10 is a flowchart illustrating another example of a process for generating generative artificial intelligence content according to an example embodiment.

In Step 1010, the system for providing content 500 may receive a landing page request. When requesting a landing page from a user, a browser agent for collecting user information required for GAI may be operated. The browser agent may be provided in a separated application form or may utilize information such as user event and web content based on JavaScript, and if necessary, it may be connected with a server side information collecting module. The system for providing content 500 may receive the landing page request through such browser agent.

In Step 1020, the system for providing content 500 may analyze information of the landing page. If the landing page request is received from the user, the system for providing content 500 may perform work for inferring taste information of the user based on data existing on the corresponding landing page. At this time, by analyzing only content information in the page area which is verified by the user, the size and cost of overall analysis may be reduced.

In Step 1030, the system for providing content 500 may extract a product item on the landing page. At this time, the system for providing content 500 may analyze information on the page based on natural language, and determine whether a product item exists by searching internal or external product database. According to an example embodiment, a provider of the landing page may set information for the product item, or set information related to the product item when connecting to the GAI.

In Step 1040, the system for providing content 500 may request related information for the product item information. When the product item information is searched, the system for providing content 500 may request additional information related to the corresponding product item information. For example, the related information may include product related sales information (e.g., sales price range, seller information, sales rate, etc.), product information (e.g., product usage, manual, reviews, etc.) and the like, and the corresponding information may be utilized as information which may estimate features of a user having interest on the corresponding product item in GAI in the future.

In Step 1050, the system for providing content 500 may generate a related information list. The system for providing content 500 may generate related information for the product item, and store separately events and the like occurred in a process for generating the corresponding related information and then manage and use it in the future.

In Step 1060, the system for providing content 500 may package data for transmitting the related information, and in Step 1070, the system for providing content 500 may generate URL for transmitting information. After this, in Step 1080, the system for providing content 500 may transmit data or URL. Like this, the system for providing content 500 may package the related information for the product item and directly transmit it, or provide it in the form of URL to the GAI according to the data transmitting method.

Meanwhile, the system for providing content 500 may collect user feedback for the provided content as generative artificial intelligence based content is provided. For example, an online platform provider may try to provide a GAI based generative content service. In this case, based on customer's opinion regarding content of customer entering or using the corresponding platform, when individual visitors enter, the corresponding platform may provide customized content by analyzing characteristics (tastes) or needs of the corresponding visitors. Through this, effects for increasing visitor entering for the corresponding platform and increasing sales or exposure of a user providing content may be expected. In this case, the corresponding platform provider may charge costs for increased traffic or purchase rate due to characteristics of the provided GAI to customers entering or using, and the customers entering or using may verify how much effect has occurred compared to before.

For example, when the visitor arrives at the landing page, the system for providing content 500 may generate visitor information and determine whether to provide generative content to the corresponding visitor. After this, the system for providing content 500 may generate generative content customized for visitor characteristics and provide the generative content to the visitor. In this case, the system for providing content 500 may store the visitor information and the information for providing generative content, and record action information of the visitor for the provided generative content.

In addition, the system for providing content 500 may analyze the effects for providing the generative content, and calculate related costs. For example, the system for providing content 500 may sample data for providing non-generative content and generative content by loading content information to be analyzed. After this, the system for providing content 500 may analyze action information (staying time, movement route, etc.) of the visitor for the sampling data, and analyze order conversion rate, revisiting rate, and the like for the sampling data. Based on the analyzed information, the system for providing content 500 may generate differentiating information on the sampling data, and calculate expected profit rate of generative content based on standard costs of a service provider (e.g., the above described online platform provider). After this, the system for providing content 500 may generate an effect report based on generative content.

Figure 11:
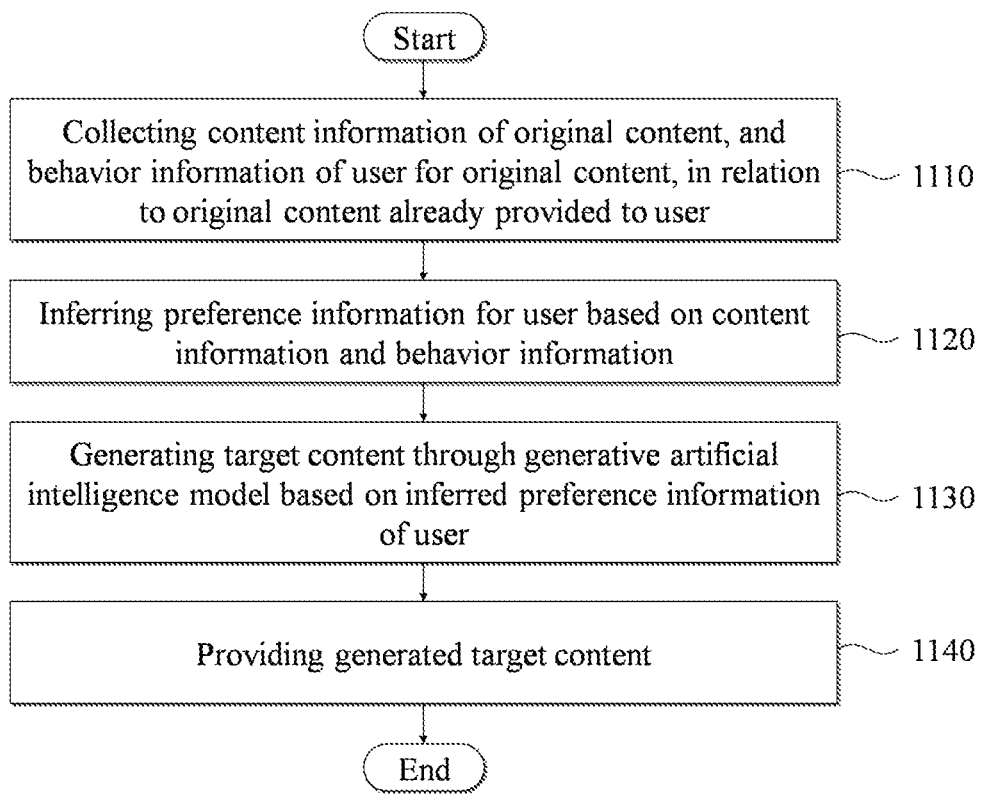
FIG. 11 is a flowchart illustrating an example of a method for providing content according to an example embodiment.

FIG. 11 is a flowchart illustrating an example of a method for providing content according to an example embodiment. A method for providing content according to an example embodiment may be performed by the computer device 200 implementing the system for providing content 500. At this time, the processor 220 of the computer device 200 may be implemented to execute control instructions according to a code of an operating system included in the memory 210 or a code of at least one computer program. Here, the processor 220 may control the computer device 200 to perform Steps 1110 to 1140 included in the method of FIG. 11 according to the control instructions provided by the code stored in the computer device 200.

In Step 1110, the computer device 200 may collect content information of original content, and behavior information of a user for the original content, in relation to the original content already provided to the user. A page including the original content may include a function for collecting behavior information of the user for the page in real-time and asynchronously. In this case, the behavior information of the user for the original content may correspond to the behavior information of the user for the page including the original content.

In Step 1120, the computer device 200 may infer preference information for the user based on the content information and behavior information. Various methods for inferring preference information of the user were described above in detail.

In Step 1130, the computer device 200 may generate target content through a generative AI model based on the inferred preference information of the user. For example, in case that content consumption time of the user inferred based on the behavior information is faster than average, the computer device 200 may generate the target content by using a first preference information of the user previously inferred for a third page which is the previous page of a first page including the original content. In addition, in the case that the content consumption time is slower than average, the computer device 200 may generate the target content by using a second preference information of the user previously inferred for the first page. In case that the content consumption time of the user is average, the target content is not generated, and the content of the first page may be used as it is.

According to an example embodiment, the computer device 200 may determine whether to provide target content based on at least one of setting of a provider of original content relating to providing target content using a generative AI model and user's consent. In this case, the computer device 200 may generate the target content through the generative AI model based on the inferred preference information of the user in case that it is determined to provide the target content.

In Step 1140, the computer device 200 may provide the generated target content. As one example embodiment, the computer device 200 may update content located at bottom of the first page in real-time as the target content according to user's scrolling for the first page including the original content. As another example embodiment, the computer device 200 may provide the target content through the second page that the user visits through the first page.

According to an example embodiment, the computer device 200 may store identification information of the original content, or identification information of a page including the original content in association with the target content. According to an example embodiment, the computer device 200 may further associate and store response information of the user for the target content. In this case, the computer device 200 may generate the target content by further using weights according to response information of users for target contents previously provided.

In addition, according to an example embodiment, the computer device 200 may generate an effect report by analyzing effects according to provision of the target content. In this case, the computer device 200 may sample data for provision of non-generative content and generative content, and calculate at least one information of order conversion rate and revisiting rate for the sampling data by analyzing action information for the sampling data. After this, the computer device 200 may calculate expected profit rate of the generative content based on service provider standard costs based on the calculated at least one information, and generate the effect report according to the generative content.

Description omitted in relation to FIG. 11 may refer to the aforementioned description of FIGS. 3 to 10.

As described above, according to example embodiments, a method and system for providing user-customized content using generative artificial intelligence may be provided.

The system and device described herein may be implemented using hardware components, software components, and/or a combination thereof. For example, the device and components described in the example embodiments may be implemented using one or more general-purpose or special purpose computers, such as, for example, a processor, a controller and an ALU (arithmetic logic unit), a digital signal processor, a microcomputer, a FPGA (field programmable gate array), a PLU (programmable logic unit), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The method according to the example embodiments may be implemented in the form of a program instruction executable by various computer means and stored in a computer-readable storage medium. The media may also include, alone or in combination with the program instructions, data files, data structures, and the like. The medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. Examples of the medium may be magnetic media such as a hard disk, a floppy disk and a magnetic tape, optical media such as a CD-ROM and a DVD, magneto-optical media such as a floptical disk, and media configured to store program instructions, including, a ROM, a RAM, and a flash memory. Furthermore, other examples of the medium may include an app store in which apps are distributed, a site in which various pieces of other software are supplied or distributed, and recording media and/or storage media managed in a server. Examples of program instructions include both machine code, such as produced by a compiler, and higher level code that may be executed by the computer using an interpreter.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

What is claimed is:

1. A method for providing content of a computer device including at least one processor, comprising:
providing, to a user terminal of a user by the at least one processor, a notification regarding provision of target content generated using a generative artificial intelligence model in response that the user terminal accesses a first page including original content;
providing, to the user terminal by the at least one processor, a selection function for selecting, in association with the generative artificial intelligence model, a preference intensity indicating a preference strength associated with the original content;

collecting content information of the original content included in the first page and behavior information of the user for the original content, in relation to the original content, by the at least one processor;

inferring preference information of the user based on the content information and the behavior information, by the at least one processor;

generating the target content through the generative artificial intelligence model based on the preference intensity selected through the selection function and the inferred preference information of the user, by the at least one processor;

providing the generated target content, by the at least one processor; and providing, to an external service by the at least one processor, identification information of the generated target content including a hash value, parameter information used to call the generative artificial intelligence model, and the preference information used by the generative artificial intelligence model to generate the target content, wherein the first page includes a function for collecting behavior information of the user for the first page in real-time and asynchronously, wherein the generating the target content comprises:
determining whether to provide the target content based on consent of the user including cookies consent with regard to provision of the target content using the generative artificial intelligence model; and
generating the target content through the generative artificial intelligence model based on the inferred preference information of the user in case that it is determined to provide the target content in response to the consent of the user, wherein the generating the target content comprises:
generating the target content by using a first preference information of the user previously inferred for a second page which the user has previously visited before the first page, in response that content consumption time for the first page by the user inferred based on the behavior information is shorter than preset average time, and
generating the target content by using a second preference information of the user inferred for the first page in response that the content consumption time is longer than the preset average time, and wherein the providing the generated target content comprises updating, in real-time, content to be displayed at bottom of the first page as the target content according to the user's scrolling operation for the first page.

2. The method for providing content of claim 1, further comprising storing identification information of the original content, or identification information of the first page in association with the target content, by the at least one processor.

3. The method for providing content of claim 2, wherein the storing further associates and stores response information of the user for the target content.

4. The method for providing content of claim 2, wherein the generating the target content generates the target content by further using weights according to response information of users for target contents previously provided.

5. The method for providing content of claim 1, further comprising generating an effect report by analyzing effects according to provision of the target content, by the at least one processor.

6. The method for providing content of claim 5, wherein the generating the effect report comprises:
sampling data for provision of non-generative content and generative content;
calculating at least one information of order conversion rate and revisiting rate for the sampling data by analyzing action information for the sampling data; and
calculating expected profit rate of the generative content based on service provider standard costs based on the calculated at least one information.

7. A computer device, comprising:
at least one processor implemented to execute an instruction readable in the computer device,
wherein the computer device is configured to:
provide, to a user terminal of a user by the at least one processor, a notification regarding provision of target content generated using a generative artificial intelligence model in response that the user terminal accesses a first page including original content;
provide, to the user terminal by the at least one processor, a selection function for selecting, in association with the generative artificial intelligence model, a preference intensity indicating a preference strength associated with the original content;
collect content information of the original content included in the first page and behavior information of the user for the original content, in relation to the original content, by the at least one processor;
infer preference information of the user based on the content information and the behavior information, by the at least one processor;
generate the target content through the generative artificial intelligence model based on the preference intensity selected through the selection function and the inferred preference information of the user, by the at least one processor;
provide the generated target content, by the at least one processor; and
provide, to an external service by the at least one processor, identification information of the generated target content including a hash value, parameter information used to call the generative artificial intelligence model, and the preference information used by the generative artificial intelligence model to generate the target content, wherein the first page includes a function for collecting behavior information of the user for the first page in real-time and asynchronously, wherein the computer device is configured to generate the target content by:
determining whether to provide the target content based on consent of the user including cookies consent with regard to provision of the target content using the generative artificial intelligence model; and
generating the target content through the generative artificial intelligence model based on the inferred preference information of the user in case that it is determined to provide the target content in response to the consent of the user, wherein the computer device is configured to generate the target content by:
generating the target content by using a first preference information of the user previously inferred for a second page which the user has previously visited before the first page, in response that content consumption time for the first page by the user inferred based on the behavior information is shorter than preset average time, and generating the target content by using a second preference information of the user inferred for the first page in response that the content consumption time is longer than the preset average time, and wherein the computer device is configured to provide the generated target content by updating, in real-time, content to be displayed at bottom of the first page as the target content according to the user's scrolling operation for the first page.

8. The computer device of claim 7, wherein the computer device is configured to store identification information of the original content, or identification information of the first page in association with the target content, by the at least one processor.

* * * * *